United States Patent
Kusumi

(10) Patent No.: US 12,430,721 B2
(45) Date of Patent: Sep. 30, 2025

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Yuichi Kusumi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/185,264

(22) Filed: Mar. 16, 2023

(65) Prior Publication Data
US 2023/0306561 A1    Sep. 28, 2023

(30) Foreign Application Priority Data
Mar. 22, 2022    (JP) .................................. 2022-044907

(51) Int. Cl.
*H04N 23/81* (2023.01)
*G06T 5/20* (2006.01)
*G06T 5/70* (2024.01)

(52) U.S. Cl.
CPC .................. *G06T 5/70* (2024.01); *G06T 5/20* (2013.01); *H04N 23/81* (2023.01)

(58) Field of Classification Search
CPC . G06T 5/70; G06T 5/20; H04N 23/81; H04N 9/64; H04N 23/95
See application file for complete search history.

(56) References Cited

U.S. PATENT DOCUMENTS

| 2014/0139705 A1 | 5/2014 | Ebe |
| 2015/0097993 A1 | 4/2015 | Oniki |
| 2017/0053390 A1* | 2/2017 | Yoshida ................. H04N 23/81 |

FOREIGN PATENT DOCUMENTS

| JP | H07021365 A |   | 1/1995 |
| JP | 2010041682 A | * | 2/2010 |
| JP | 2012129627 A |   | 7/2012 |
| JP | 2021047297 A |   | 3/2021 |

OTHER PUBLICATIONS

JP2010041682A Image Processing Apparatus, and Image Processing Method (Year: 2010).*

* cited by examiner

*Primary Examiner* — Twyler L Haskins
*Assistant Examiner* — Surafel Yilmakassaye
(74) *Attorney, Agent, or Firm* — Canon U.S.A., Inc. IP Division

(57) ABSTRACT

An image processing apparatus includes at least one memory configured to store instructions, and at least one processor configured to execute the instructions to acquire a captured image obtained using an optical system, and information on an imaging condition corresponding to the captured image, and perform deteriorating processing for the captured image based on an F-number of the optical system, the F-number being included in the information on the imaging condition. A first deterioration amount in the deteriorating processing in a case where the F-number is a first F-number is smaller than a second deterioration amount in the deteriorating processing in a case where the F-number is a second F-number larger than the first F-number.

12 Claims, 9 Drawing Sheets

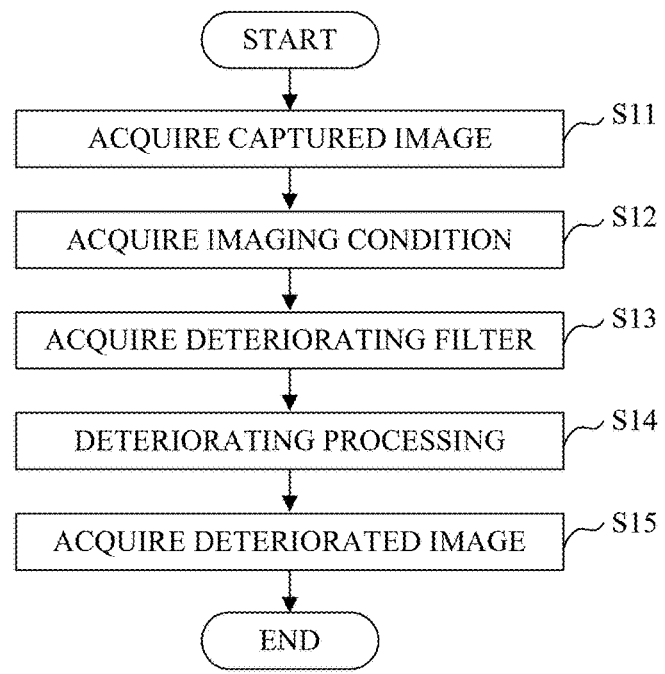
FIG. 5
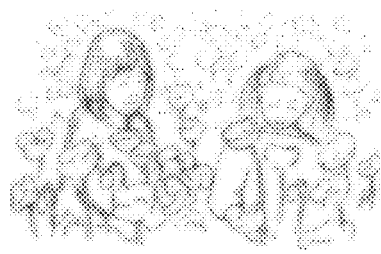
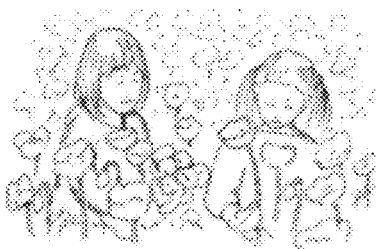
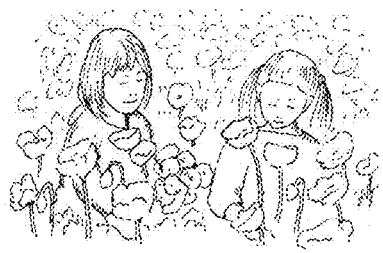
FIG. 6A  FIG. 6B  FIG. 6C

OPEN F-NUMBER A    F-NUMBER B    F-NUMBER C
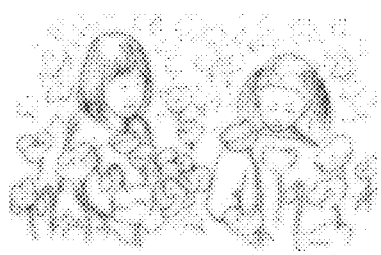 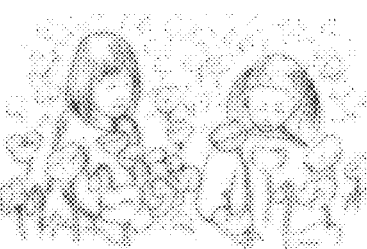 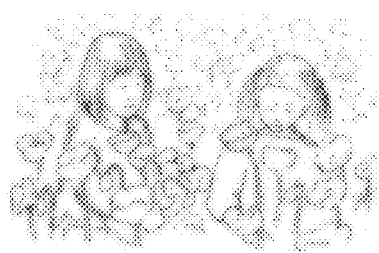
FIG. 8A        FIG. 8B        FIG. 8C
OPEN F-NUMBER A    F-NUMBER B    F-NUMBER C
  
FIG. 9A        FIG. 9B        FIG. 9C
OPEN F-NUMBER A    F-NUMBER B    F-NUMBER C
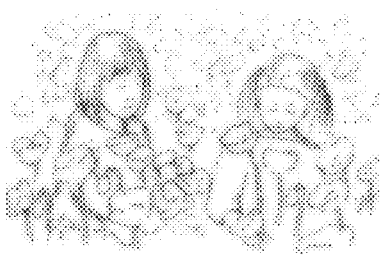 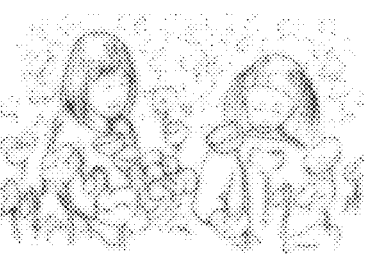 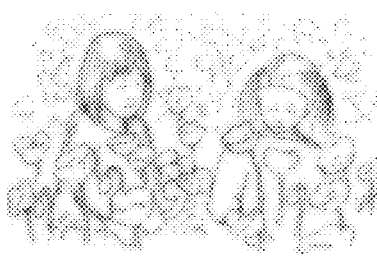
FIG. 10A       FIG. 10B       FIG. 10C

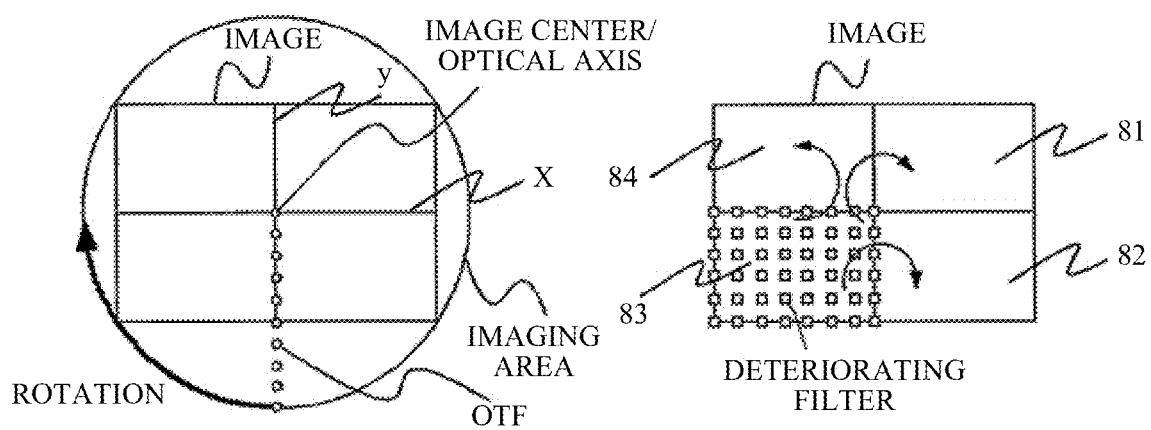
FIG. 12A
FIG. 12C
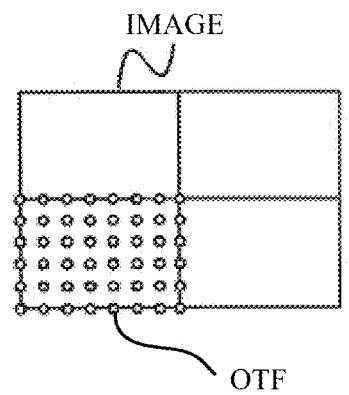
FIG. 12B
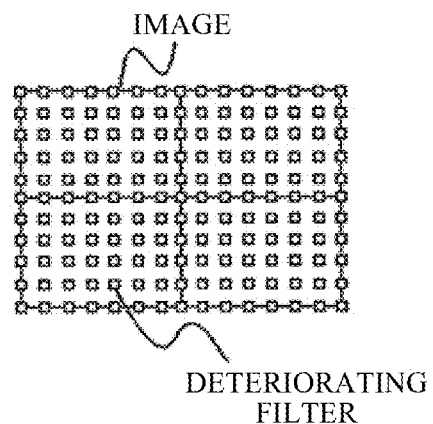
FIG. 12D
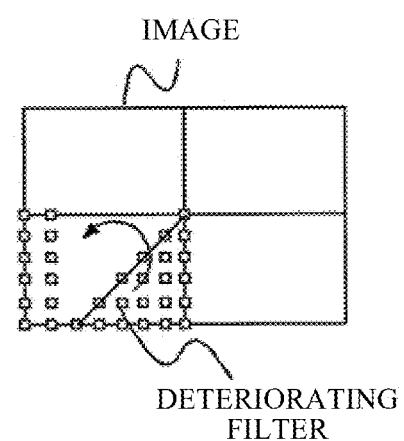
FIG. 12E

IMAGE PROCESSING APPARATUS, IMAGE PICKUP APPARATUS, IMAGE PROCESSING METHOD, AND STORAGE MEDIUM

BACKGROUND

Technical Field

One of the aspects of the disclosure relates to an image processing apparatus, an image pickup apparatus, an image processing method, and a storage medium (or program).

Description of Related Art

An imaging optical system has conventionally been known that can express a desired appearance (image effect such as a soft focus effect) in addition to resolution by utilizing the influence of aberration such as spherical aberration. For example, by intentionally generating spherical aberration, the soft focus effect provides an appearance that filters light through a highlighted portion, and an appearance that smooths a fine skin structure or the like. Japanese Patent Application Laid-Open No. (JP) 2021-47297 discloses an imaging optical system that can provide a soft focus effect that softly blurs a main object by controlling a spherical aberration amount.

With a small aperture in the aperture stop (large F-number (aperture value)) in the imaging optical system disclosed in JP 2021-47297, the influence of the spherical aberration becomes small and thus the image effect (soft focus effect) is reduced.

SUMMARY

One of the aspects of the present disclosure provides an image processing apparatus that can provide an image effect utilizing aberration even with a small aperture in an aperture stop.

An image processing apparatus according to one aspect of the disclosure includes at least one memory configured to store instructions, and at least one processor configured to execute the instructions to acquire a captured image obtained using an optical system, and information on an imaging condition corresponding to the captured image, and perform deteriorating processing for the captured image based on an F-number of the optical system, the F-number being included in the information on the imaging condition. A first deterioration amount in the deteriorating processing in a case where the F-number is a first F-number is smaller than a second deterioration amount in the deteriorating processing in a case where the F-number is a second F-number larger than the first F-number. An image pickup apparatus having the above image processing apparatus also constitutes another aspect of the disclosure. An image processing method corresponding to the above image processing apparatus also constitutes another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

BRIEF DESCRIPTION OF THE DRAWINGS

FIG. 5 is a flowchart of an image processing method according to a first embodiment.

FIGS. 6A to 6C illustrate images captured by an imaging optical system having spherical aberration according to the first embodiment.

FIGS. 8A to 8C illustrate deteriorated images obtained by performing deteriorating processing for images captured by the imaging optical system having spherical aberration according to the first embodiment.

FIGS. 9A to 9C illustrate images captured by the imaging optical system having no spherical aberration according to the first embodiment.

FIGS. 10A to 10C illustrate deteriorated images obtained by performing deteriorating processing for images captured by an imaging optical system having no spherical aberration according to the first embodiment.

FIGS. 12A to 12E illustrate a method of generating a deteriorating filter according to the second embodiment.

DESCRIPTION OF THE EMBODIMENTS

Figure 1:
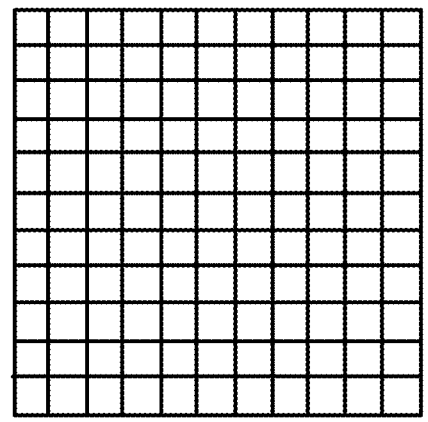
FIG. 1 explains a deteriorating filter according to each embodiment.

Referring now to the accompanying drawings, a detailed description will be given of embodiments according to the disclosure.

A description will now be given of definitions of terms and deteriorating processing (image processing method) explained in each embodiment. The image processing method described here is properly used according to each embodiment which will be described below.

Captured Image

A captured image obtained by the image pickup apparatus is a digital image obtained from an image sensor that has received light via the imaging optical system. Due to the influence of a variety of aberrations such as spherical aberration, coma, a curvature of field, and astigmatism, the image has a blur component and is deteriorated. The blur component of the image caused by the aberration spreads out, on an imaging plane, a light beam emitted from a single point on an object due to the influence of aberration and/or diffraction, which would be condensed on a single point in the imaging plane without the influence of aberration or diffraction. The blur component of the image is represented by a point spread function (PSF hereinafter) or an optical transfer function (OTF hereinafter). The imaging optical system can include not only a lens but also a mirror (reflective surface) having a curvature.

The color components of the captured image have, for example, RGB color component information. The color components can also select and use common color spaces such as brightness, hue, and saturation represented by LCH, and luminance and a color difference signal represented by YCbCr. Other color spaces can use XYZ, Lab, Yuv, and JCh. Color temperature may also be used.

The captured image (input image) and output image can be accompanied by an imaging condition such as a focal length, F-number (aperture value), imaging distance of the lens, and various types of correction information for performing processing such as correction of the image. In a case where an image is communicated from an image pickup apparatus to another image processing apparatus for processing such as correction, information about the processing such as the imaging condition and correction may be attached to the captured image as described above. As another communication method of information about processing such as the imaging condition and correction, the image pickup apparatus and the image processing apparatus may be directly or indirectly connected to communicate the information. In each embodiment, an image (captured image) as a target of deteriorating processing may be either a still image or a moving image.

Deteriorating Processing

A description will now be given of an overview of the deteriorating processing. Now consider the imaging process using an imaging optical system. Where g(x, y) is a captured image, f(x, y) is an original image, and h(x, y) is a PSF as a Fourier pair of an OTF, the following equation (1) is established:

$$g(x,y)=h(x,y)*f(x,y) \quad (1)$$

The asterisk * represents a convolution (convolution integral, product sum), and (x, y) represents the coordinates on the captured image. h(x, y) has a characteristic based on the aberration of the imaging optical system. h(x, y) changes depending on the F-number of the imaging optical system. In other words, as the aperture is decreased from the maximum aperture (the F-number is increased), the influence of aberrations tends to decrease and a deterioration amount of h(x, y) tends to decrease.

Next, consider the deteriorating processing for acquiring a deteriorated image g2 by performing convolution processing for the captured image g with a deteriorating filter d. Then, the following equation (2) is established:

$$g2(x,y)=d(x,y)*g(x,y) \quad (2)$$

Here, d(x, y) will be referred to as a deteriorating filter. In a case where the image is a two-dimensional image, the deteriorating filter d is also a two-dimensional filter having taps (cells) corresponding to each pixel of the image. Generally, the larger number of taps (the number of cells) the deteriorating filter d has, the wider the spread caused by the deterioration becomes. Hence, the number of taps that can be realized is set according to the required image quality, image processing capability, aberration, an image effect characteristic (deterioration amount, spread), or the like.

Since the deteriorating filter d may reflect the aberration characteristic, it is different from a blurring filter such as a simple Gaussian characteristic. In a case where a characteristic corresponding to a PSF of an imaging optical system having spherical aberration is used as a deteriorating filter d, a soft focus effect can be imparted to the captured image.

Figure 2:
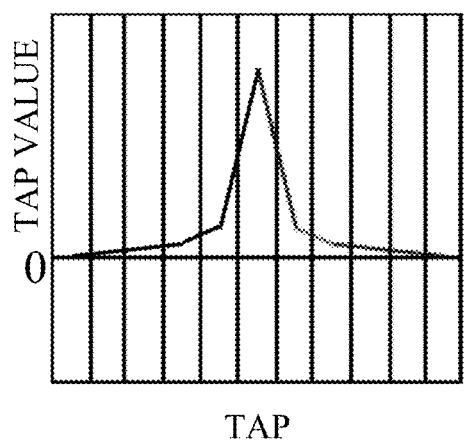
FIG. 2 is an explanatory (sectional) view of the deteriorating filter according to each embodiment.

Referring now to FIGS. 1 and 2, a description will be given of the deteriorating filter. FIGS. 1 and 2 explain the deteriorating filter. FIG. 1 illustrates a two-dimensional filter with 11×11 taps, as an example. FIG. 1 omits a value (coefficient) in each tap, and FIG. 2 illustrates a section of the deteriorating filter. The distribution of the tap values (coefficient values) of the deteriorating filter has the function of deteriorating the captured image with spatially spread signal values.

Each tap of the deteriorating filter undergoes convolution processing (convolution integration, sum of products) in the deteriorating processing corresponding to each pixel of the image. In order to deteriorate the signal value of a given pixel, the convolution processing makes that pixel correspond to the center of the deteriorating filter, calculates the product of the signal value of the image and the coefficient value of the filter for each corresponding pixel of the image and the deteriorating filter, and replaces the sum with the signal value of the center pixel.

Figure 3:
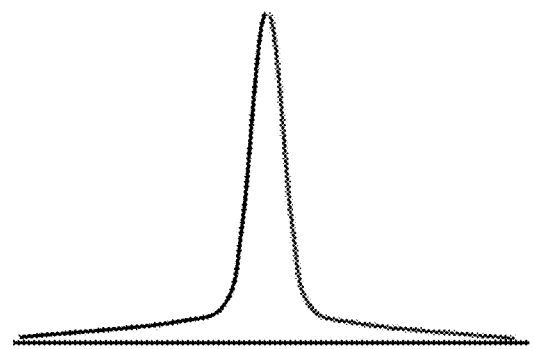
FIG. 3 explains a point spread function as the deteriorating filter according to each embodiment.
Figure 4:
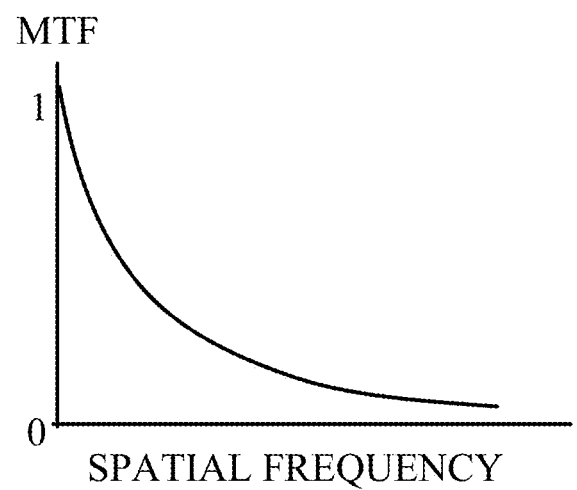
FIG. 4 explains an amplitude component of an optical transfer function, which is a Fourier transform of the point spread function as the deteriorating filter according to each embodiment.

Referring now to FIGS. 3 and 4, a description will be given of the characteristics of the deteriorating filter in the real space and frequency space. FIG. 3 explains a PSF as a deteriorating filter. FIG. 4 explains an amplitude component (modulation transfer function: MTF) of an OTF, which is the Fourier transform of the PSF that is used as the deteriorating filter. In FIG. 4, the horizontal axis represents the spatial frequency, and the vertical axis represents the MTF.

As illustrated in FIG. 3, in an imaging optical system having spherical aberration, the PSF has a distribution in which a central portion has a large value and peripheral portions have small values and are widely spread. This distribution has a soft filter effect. In other words, in a case where a PSF of an imaging optical system having spherical aberration is used as a deteriorating filter, the distribution has pixels equal to or larger than an effective value but smaller than a threshold more than pixels equal to or larger than the threshold. At this time, if the threshold is set to half a maximum value of the deteriorating filter and the effective value is set to a reciprocal of a maximum value that the image can take, the distribution of the deteriorating filter will have the soft filter effect as described above.

Thus, the deteriorating filter can be acquired based on the PSF or OTF of the imaging optical system. However, the deteriorating filter that is used in this embodiment can be modified as appropriate. For example, the PSF of the imaging optical system may be adjusted and used as the deteriorating filter, or the PSF of the imaging optical system different from the PSF of the imaging optical system that has been used for imaging may be used as the deteriorating filter. A unique deteriorating filter may be created and used that is not derived from the aberration of the image pickup optical system and that provides a desired image effect.

Since the PSF and OTF depending on aberration change according to the image height (image position) of the imaging optical system even in a single imaging state, the deteriorating filter may be modified and used according to the image height. Alternatively, a uniform (constant) deteriorating filter may be used within a single image. For example, a deteriorating filter corresponding to the PSF on the optical axis may be uniformly used within the image.

For wavelengths, the OTF or PSF is calculated at a plurality of wavelengths, and the OTF or PSF for each color component can be generated by weighting each wavelength based on the spectrum of an assumed light source and light-receiving sensitivity information of the image sensor. Alternatively, the calculation may be performed with a predetermined representative wavelength for each color component. The deteriorating filter can be generated based on the OTF or PSF for each color component.

As described above, the aberration of the imaging optical system decreases as the F-number increases. For example, in an imaging optical system having spherical aberration and a soft focus effect, the soft focus effect decreases as the F-number increases. Thus, by previously storing a plurality of deteriorating filters according to F-numbers and by performing deteriorating processing using the deteriorating filter according to the imaging condition having the F-number, an image having a soft focus effect can be acquired even with a small aperture.

Each specific embodiment will be described in detail below.

First Embodiment

Referring now to FIG. 5, a description will be given of an image processing method according to a first embodiment of the disclosure. FIG. 5 is a flowchart of the image processing method (image processing program) according to this embodiment. The image processing method according to this embodiment is executed by a computer that includes a CPU as an image processing apparatus according to an image processing program as a computer program. This is similarly applied to other embodiments described below.

First, in step S11, the image processing apparatus acquires a captured image which the image pickup apparatus has generated by imaging. The captured image from the image pickup apparatus may be acquired via wired or wireless communication between the image pickup apparatus and the image processing apparatus or may be acquired from a storage medium such as a semiconductor memory or an optical disc.

Next, in step S12, the image processing apparatus acquires an imaging condition (imaging condition information, information about the imaging condition) when the image pickup apparatus generated the captured image by imaging. As described above, the imaging condition includes a focal length, F-number (aperture value), and imaging distance of the imaging optical system, as well as identification information (camera ID) of the image pickup apparatus and the like. In an image pickup apparatus in which the imaging optical system is interchangeable, the imaging condition may include identification information (lens ID) of the imaging optical system (e.g., for an interchangeable lens). The imaging condition information may be acquired as information attached to the captured image as described above, or may be acquired via wired or wireless communication or from a storage medium.

Next, in step S13, the image processing apparatus acquires a deteriorating filter that will be used for deteriorating processing, which will be described below. In this embodiment, the image processing apparatus acquires the deteriorating filter based on the PSF of the imaging optical system. More specifically, in this embodiment, the image processing apparatus acquires the deteriorating filter based on a PSF in a focal plane on the optical axis at an open aperture (F-number) of the imaging optical system. However, the disclosure is not limited to this embodiment.

The image processing apparatus selects and acquires a proper deteriorating filter according to the imaging condition from among a plurality of deteriorating filters previously stored for each imaging condition. If the imaging condition such as an F-number, an imaging distance, and a focal length of a zoom lens is a specific imaging condition, a deteriorating filter corresponding to the imaging condition can be generated by interpolation processing from among the previously stored deteriorating filters of other imaging conditions. In this case, a data amount of the deteriorating filter to be stored may be reduced. The interpolation processing may use, for example, bilinear interpolation (linear interpolation), bicubic interpolation, or the like, but the interpolation processing is not limited to these examples.

In this embodiment, a deteriorating filter is stored for each F-number, and the image processing apparatus acquires the deteriorating filter based on the F-number. Therefore, in step S12, the image processing apparatus needs to acquire at least the F-number as the imaging condition.

Instead of the PSF that is used as a deteriorating filter, deterioration information such as the OTF may be acquired, and a deteriorating filter based on the PSF obtained by Fourier-transforming the OTF may be acquired. Alternatively, the deteriorating filter may be acquired, which is a frequency characteristic based on the OTF, and the deteriorating processing described below may multiply a spectrum image obtained by Fourier-transforming a captured image by the deteriorating filter, which is a frequency characteristic, so as to perform convolution processing.

Coefficient data may be approximated with the deterioration information on the imaging optical system and the deteriorating filter fitted to a predetermined function, and the deteriorating filter may be acquired by reconstructing the OTF, the PSF, or the deteriorating filter from the coefficient data. For example, the OTF may be fitted using the Legendre polynomial. Alternatively, other functions such as the Chebyshev polynomial may be used for fitting.

Part of the two-dimensional deteriorating filter may be stored and used. For example, a data amount can be reduced by storing deteriorating filters for one quadrant, which is a quarter of a two-dimensional deteriorating filter. Alternatively, a data amount may be reduced by storing a plurality of one-dimensional tap data that are components of a two-dimensional deteriorating filter. For example, a data amount can be reduced by storing one-dimensional data that is half of the horizontal and vertical data including the center of the two-dimensional deteriorating filter. This embodiment is not limited to this example, and on the premise that the deteriorating filter is symmetrical (symmetric within the tap), the data amount can be reduced by storing the data obtained by decomposing the deteriorating filter using fitting or the singular value decomposition theorem. In other words, by utilizing the fact that the deteriorating filter is symmetrical (symmetric within the tap), a data amount can be reduced by storing part or component of the data of the entire two-dimensional deteriorating filter.

The deteriorating filter to be acquired may be a filter that can reduce a change in image effect according to the F-number of the imaging optical system. FIGS. 6A to 6C illustrate images captured by imaging with different F-numbers by an imaging optical system having spherical aberration. FIG. 6A illustrates the image corresponding to a maximum aperture A. FIG. 6B illustrates the image corresponding to F-number B. FIG. 6C illustrates the image corresponding to F-number C. These F-numbers have a relationship where the maximum aperture A<the F-number B<the F-number C. For example, in imaging using the imaging optical system that has spherical aberration (or large spherical aberration) illustrated in FIGS. 6A to 6C, the image effect decreases as the F-number increases, although the image having the desired image effect (soft filter effect) can be captured with the maximum aperture A. Accordingly, by acquiring a deteriorating filter according to the F-number and by performing deteriorating processing, the deteriorating filter is acquired such that an image effect close to that with the maximum aperture can be obtained even if the F-number is increased. That is, the deteriorating filter is acquired such that a deterioration amount in the deteriorating processing at a first F-number is smaller than a deterioration amount in the deteriorating processing at a second F-number larger than the first F-number. In other words, in a case where the F-number is the first F-number, a deterioration amount in the deteriorating processing is a first deterioration amount, and in a case where the F-number is a second F-number larger than the first F-number, a deterioration amount is a second deterioration amount larger than the first deterioration amount.

The deterioration amount means the degree to which an image is deteriorated by the deteriorating filter, and corresponds to a blur amount in performing deteriorating processing (blurring processing) for a captured image. For example, 1−(an absolute value of a deteriorating filter in frequency space) is set to the deterioration amount. Alternatively, an average value of 1−(the absolute value of the deteriorating filter in the frequency space) may be set to the deterioration amount, or the weighted average of values at different frequencies may be set to the deterioration amount. A spread width of a deteriorating filter may be set to the deterioration amount.

The deterioration amount may be adjusted by reducing the deterioration amount by reducing the deteriorating filter (PSF at the maximum aperture) which maximizes the deterioration amount. The deterioration amount may be reduced by weighted averaging of the deteriorating filter and a delta function that is 1 at the center and 0 at the non-center points. A deteriorating filter whose deterioration amount has previously been adjusted may be acquired, or a deterioration amount may be adjusted after the deteriorating filter is acquired. The deteriorating filter may be acquired by subtracting a PSF component at each F-number of the imaging optical system from the deteriorating filter (PSF at the maximum aperture) that maximizes the deterioration amount. More specifically, the deteriorating filter may be acquired by performing an inverse Fourier transform for a value made by dividing the OTF at the maximum aperture by the OTF at each F-number.

Figure 7:
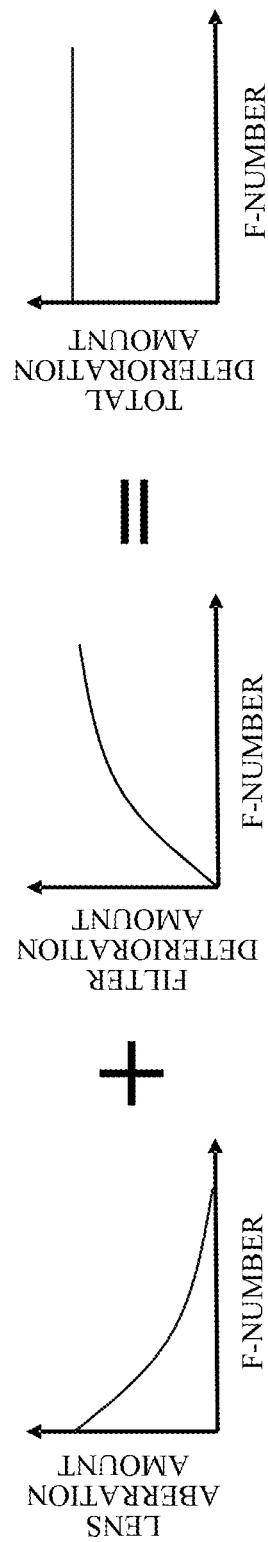
FIG. 7 illustrates a deterioration amount in deteriorating processing against an aberration amount of the imaging optical system according to the first embodiment.

FIG. 7 illustrates a deterioration amount in deteriorating processing against an aberration amount of the imaging optical system. As illustrated in FIG. 7, for example, the deteriorating filter may be set such that a deterioration amount of a deteriorated image, that is, an image effect may not be changed according to an F-number by increasing the deterioration amount of the deteriorating filter according to the F-number against the aberration amount according to the F-number of the imaging optical system. Alternatively, the deteriorating filter may be set such that a change in the image effect according to the F-number of the imaging optical system can be reduced by increasing the deterioration amount of the deteriorating filter according to the F-number against the aberration amount according to the F-number of the imaging optical system.

FIGS. 8A to 8C illustrate deteriorated images obtained by performing deteriorating processing for images captured by imaging with different F-numbers by an imaging optical system having spherical aberration. FIG. 8A illustrates the images corresponding to the maximum aperture A. FIG. 8B illustrates the image corresponding to the F-number B. FIG. 8C illustrates the image corresponding to the F-number C. These F-numbers have a relationship where the maximum aperture A<the F-number B<the F-number C. In the captured images illustrated in FIGS. 6A to 6C, the image effect decreases as the F-number increases. On the other hand, in the deteriorated images illustrated in FIGS. 8A to 8C, the image effect with the open aperture can be maintained even if the F-number is increased. The deteriorating filter acquired here may be based on the PSF at the maximum aperture of the imaging optical system. The deteriorating filter may be stored for each imaging optical system, and the deteriorating filter may be acquired according to the imaging optical system.

In a case where deteriorating processing is performed for an image captured by an imaging optical system in which a spherical aberration amount is adjustable, a deteriorating filter may be acquired according to the aberration amount of the imaging optical system. That is, the deterioration amount of the deteriorating filter may be increased as the aberration amount of the imaging optical system is increased.

FIGS. 9A to 9C illustrate images captured by imaging with different F-numbers by an imaging optical system that has no spherical aberration. FIG. 9A illustrates the image corresponding to the maximum aperture A. FIG. 9B illustrates the image corresponding to the F-number B. FIG. 9C illustrates the image corresponding to the F-number C. These F-numbers have a relationship where the maximum aperture A<the F-number B<the F-number C. As illustrated in FIGS. 9A to 9C, in a case where an image is captured by an imaging optical system with no spherical aberration (or with small spherical aberration), the image effect of the imaging optical system with spherical aberration cannot be obtained. An image effect similar to that provided with the imaging optical system having spherical aberration can be obtained even with the imaging optical system having no spherical aberration by acquiring a deteriorating filter based on the PSF at the maximum aperture of the imaging optical system having spherical aberration and by performing deteriorating processing for the captured image. In other words, a deteriorating filter may be acquired based on a PSF of an imaging optical system different from the imaging optical system that has been used to acquire the captured image.

At this time as well, the deteriorating filter is acquired such that an image effect similar to that with the maximum aperture of the imaging optical system that has spherical aberration can be obtained even if the F-number is increased, by performing the deteriorating processing using the deteriorating filter according to the F-number. Since there is aberrational influence to some extent even with the maximum aperture of an imaging optical system that has no spherical aberration, a deteriorating filter with a small deterioration amount is acquired near the maximum aperture in consideration of the aberration amount. That is, the deteriorating filter is obtained such that a deterioration amount in deteriorating processing at a first F-number is smaller than a deterioration amount in deteriorating processing at a second F-number larger than the first F-number.

FIGS. 10A to 10C illustrate deteriorated images obtained by performing deteriorating processing for images captured by imaging with different F-numbers by an imaging optical system that has no spherical aberration. FIG. 10A illustrates the image corresponding to the maximum aperture A. FIG. 10B illustrates the image corresponding to the F-number B. FIG. 10C illustrates the image corresponding to the F-number C. These F-numbers have a relationship where the maximum aperture A<the F-number B<the F-number C. The captured images illustrated in FIGS. 9A to 9C cannot provide an image effect corresponding to an imaging optical system having spherical aberration. On the other hand, the deteriorated images illustrated in FIGS. 10A to 10C can provide the image effect of the imaging optical system having spherical aberration, and maintain the image effect caused by the aberration even if the F-number is increased.

This embodiment uses the PSF of the imaging optical system having spherical aberration as the deteriorating filter, but the disclosure is not limited to this embodiment, and can use deteriorating filters having various characteristics. For example, the PSF of the imaging optical system having coma may be used as the deteriorating filter, or a unique deteriorating filter that provides an effect close to the image effect caused by the aberration of the imaging optical system may be created and used.

Next, in step S14 of FIG. 5, the image processing apparatus performs deteriorating processing for the captured image using the deteriorating filter. That is, convolution processing is performed for the captured image using the deteriorating filter. In acquiring the deteriorating filter based on the PSF on the optical axis as in this embodiment, a uniform (constant) deteriorating filter is used for a position on the image. Similar to the PSF of the imaging optical system that changes according to the position on the image, if the deteriorating filter is acquired for each image position, the deteriorating filter may be changed and used according to the image position.

Next, in step S15, the image processing apparatus acquires a deteriorated image that has undergone the deteriorating processing. At this time, the image processing apparatus may perform various processing relating to laying-out processing for the refined image.

This embodiment generates a deteriorated image by acquiring a deteriorating filter and by performing convolution processing for the captured image, but deteriorating processing may be performed using another method. For example, the deteriorating processing may be performed by reducing and enlarging the captured image, or the deteriorating processing may be performed by weighted averaging of the images obtained by reducing and enlarging the captured image and the captured image. The deterioration amount may be adjusted by weighted averaging of the image convoluted with the deteriorating filter and the captured image. More specifically, the deterioration amount may be adjusted by performing the convolution processing of the deteriorating filter a plurality of times. However, the deterioration amount of the deteriorating processing may be adjusted so as to reduce a change in the image effect according to the F-number of the imaging optical system.

Second Embodiment

Figure 11:
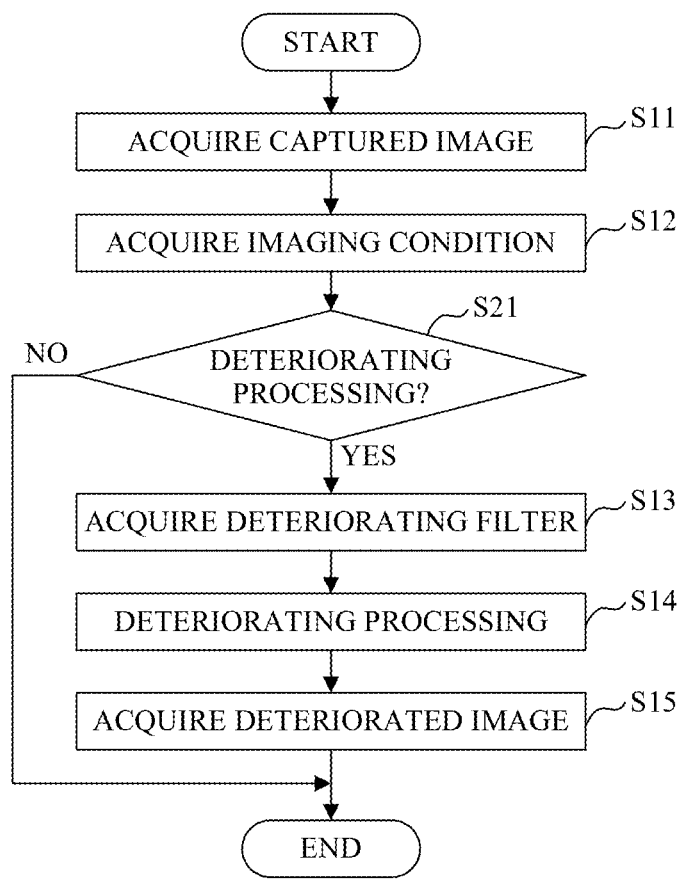
FIG. 11 is a flowchart of an image processing method according to a second embodiment.

A description will be given of an image processing method according to a second embodiment of the disclosure. This embodiment includes processing for determining whether or not to perform deteriorating processing based on an imaging condition (imaging condition information). FIG. 11 is a flowchart of an image processing method (image processing program) according to this embodiment. In this embodiment, the computer executes the image processing program according to the flow of FIG. 11. Steps S11, S12, S13, S14, and S15 in FIG. 11 are the same as those in FIG. 5 described in the first embodiment, so a description thereof will be omitted.

In step S21, the image processing apparatus determines whether or not to perform deteriorating processing. The image processing apparatus that has determined to perform the deteriorating processing performs the deteriorating processing based on the flow of the first embodiment. On the other hand, the image processing apparatus that has determined not to perform the deteriorating processing ends this flow.

Determining whether or not to perform deteriorating processing is based on the imaging condition. For example, in a case where the F-number is equal to or larger than a threshold, deteriorating processing is performed. The threshold may be set to an F-number at which the image effect caused by the aberration of the imaging optical system is lost. It may be determined whether or not to perform deteriorating processing based on the information about the imaging optical system. For example, the deteriorating processing may be performed in a case where the imaging optical system has spherical aberration, and the deteriorating processing may not be performed in a case where the imaging optical system has no spherical aberration. This configuration can maintain the image effect caused by the aberration of the imaging optical system even when the F-number is increased, by performing the deteriorating processing, in a case where the image effect is reduced according to the F-number in the imaging optical system having spherical aberration without the deteriorating processing. Alternatively, performing deteriorating processing in a case where the imaging optical system has no spherical aberration can provide an image effect similar to that provided by the imaging optical system having spherical aberration. In this case, the user may previously select whether or not a processing mode to perform the deteriorating processing is set, and may determine whether or not to perform the deteriorating processing according to the processing mode.

Next, in step S13, the image processing apparatus acquires a deteriorating filter for the deteriorating processing, which will be described below. This embodiment will discuss an example in which a deteriorating filter is acquired for each position on the image based on the imaging condition. The embodiment acquires the OTF as the deterioration information, and the deteriorating filter based on the OTF.

First, the image processing apparatus acquires deterioration information suitable for the imaging condition. In this embodiment, the deterioration information is the OTF. The image processing apparatus selects and acquires a proper OTF from a plurality of previously stored OTFs according to the imaging condition. In a case where an imaging condition such as an F-number, imaging distance, and focal length of a zoom lens is a specific imaging condition, the OTF corresponding to the imaging condition can be generated by interpolation processing from previously stored OTFs corresponding to other imaging conditions. In this case, a data amount of the OTF to be stored can be reduced. The interpolation processing may use, for example, bilinear interpolation (linear interpolation), bicubic interpolation, or the like, but the interpolation processing is not limited to the example. This embodiment acquires the OTF at the maximum aperture, and the deteriorating filter based on the acquired OTF.

In this embodiment, the image processing apparatus acquires the OTF as the deterioration information, but the deterioration information is not limited to the OTF. Instead of the OTF, the deterioration information such as the PSF may be acquired and used as a deteriorating filter. In this embodiment, the image processing apparatus may acquire coefficient data approximated with deterioration information fitted to a predetermined function, and reconstruct the OTF or PSF from the coefficient data. For example, the OTF may be fitted using the Legendre polynomial. Alternatively, other functions such as the Chebyshev polynomial may be used for fitting. In this embodiment, the image processing apparatus generates a plurality of OTFs in one direction passing through the image center (the center of the captured image) or the optical axis of the imaging optical system.

Next, the image processing apparatus rotates the OTF around the image center (the center of the captured image) or the optical axis of the imaging optical system to lay out the OTFs. More specifically, the image processing apparatus interpolates the OTF according to the pixel array, thereby discretely arranging the OTFs at a plurality of positions within the captured image.

Next, the image processing apparatus converts the OTF into a deteriorating filter, that is, generates the deteriorating filter using the laid-out OTFs. A deteriorating filter is generated by creating a deteriorating filter characteristic in a frequency space based on the OTF and by transforming it into a filter in real space (deteriorating filter) by the inverse Fourier transform.

FIGS. 12A to 12E explain a generation method of the deteriorating filter. As illustrated in FIG. 12A, OTFs are arranged in an area of a circumscribed circle of the image (imaging area) in one direction (vertical direction) passing through the image center (the center of the captured image) or the optical axis of the imaging optical system.

This embodiment lays out the OTFs on a straight line as illustrated in FIG. 12A, but the disclosure is not limited to this embodiment. For example, assume that in the captured image plane, a first straight line (y in FIG. 12A) and a second straight line (x in FIG. 12A) are defined as straight lines that pass through the center of the captured image or the optical axis of the imaging optical system and are orthogonal to each other. At this time, at least two OTFs among the acquired OTFs may be OTFs corresponding to positions (image heights) on the first straight line. That is, as long as the OTFs are arranged at a plurality of positions (a plurality of positions in the captured image) arranged at different distances in a predetermined direction from the image center or the optical axis of the imaging optical system, these OTFs may not have to be linearly arranged. If there is no pixel that includes the center of the captured image or the optical axis of the imaging optical system, that is, if there is a center of the captured image or the optical axis of the imaging optical system between pixels, the acquired OTFs may be OTFs corresponding to positions (image heights) of the pixels that sandwich the first straight line.

In arranging the OTFs in one direction, the direction is not limited to the vertical direction and may be another direction such as the horizontal direction. In a case where the OTFs are linearly arranged in either the vertical direction or the horizontal direction, the image processing according to this embodiment can be more easily performed.

Next, the OTFs are rotated, interpolation processing (various processing according to the pixel array after the rotation) is performed as necessary, and the OTFs are rearranged as illustrated in FIG. 12B. The interpolation processing includes interpolation processing in a radial direction and interpolation processing associated with the rotation, and can relocate the OTFs to arbitrary positions.

Next, by performing an inverse Fourier transform for the OTF at each position, conversion to a PSF in real space, that is, a deteriorating filter is performed as illustrated in FIG. 12C.

That is, assume that in the captured image, the first straight line (y in FIG. 12A) and the second straight line (x in FIG. 12A) are the straight lines passing through the center of the captured image or the optical axis of the imaging optical system and orthogonal to each other. That is, the first straight line (y in FIG. 12A) and the second straight line (x in FIG. 12A) intersect each other at the optical axis of the imaging optical system or at the center of the captured image. A second area (81 in FIG. 12C) of the captured image is defined as an area that is symmetrical to a first area (83 in FIG. 12C) of the captured image with respect to the center of the captured image or the optical axis OA of the imaging optical system. A third area (82 in FIG. 12C) of the captured image is defined as an area that is symmetrical to the first area (83 in FIG. 12C) of the captured image with respect to the first straight line (y in FIG. 12A). And a fourth area (84 in FIG. 12C) in the captured image is defined as an area that is symmetrical to the first area (83 in FIG. 12C) of the captured image with respect to the second straight line (x in FIG. 12A). At this time, the OTF of the first area (83) is used to generate the OTFs of the second area (81), the third area (82), or the fourth area (84). Thereby, the burden of the Fourier transform processing is reduced to approximately a quarter of a final relocation area. If the OTFs illustrated in FIG. 12B and the deteriorating filters illustrated in FIG. 12C are rearranged by rotation and interpolation processing as illustrated in FIG. 12E and laid out as illustrated in FIG. 12D by utilizing the symmetry, the burden of the Fourier transform processing is further reduced. The arrangements illustrated in FIGS. 12A to 12E (arrangement density of deteriorating filters) are merely illustrative, and the arrangement interval can be arbitrarily set according to the variation of the OTF of the imaging optical system.

As described in the first embodiment, the deteriorating filter to be acquired may be a filter that can reduce a change in image effect according to the F-number of the imaging optical system. Therefore, the deteriorating filter is acquired so as to maintain an image effect close to that at the maximum aperture even if the F-number is increased by acquiring the deteriorating filter corresponding to the F-number and by performing deteriorating processing based on the F-number. That is, the deteriorating filter is acquired so that a deterioration amount in deteriorating processing at a first F-number is smaller than a deterioration amount in deteriorating processing at a second F-number larger than the first F-number. As in this embodiment, in acquiring a deteriorating filter from the OTF at the maximum aperture of the imaging optical system, the deteriorating filter may be acquired in which the deterioration amount is adjusted by performing an inverse Fourier transform for a weighted average of the OTF and a characteristic in which all frequencies are 1. Alternatively, a deterioration amount may be reduced by reducing a deteriorating filter (PSF at the maximum aperture) that maximizes the deterioration amount or a deterioration amount may be reduced by weighted averaging of the deteriorating filter and a delta function that is 1 at the center and 0 at the non-center points. The deteriorating filter may be acquired by performing an inverse Fourier transform for a value made by dividing the OTF at the maximum aperture by the OTF at each F-number.

In this embodiment, on the premise that the OTF is rotationally symmetrical with respect to the center of the imaging plane (image center) or the optical axis of the imaging optical system, this embodiment rotates and lays out the OTFs arranged in one direction that passes through the image center or the optical axis of the imaging optical system. Thereby, a deteriorating filter can be acquired with a small data amount and deteriorating processing can be performed.

The generation and acquisition of the deteriorating filter have been described above, but the disclosure is not limited to this embodiment. A deteriorating filter may be generated and previously stored for each imaging condition, and a deteriorating filter is similarly acquired based on the imaging condition. The deteriorating filter may be acquired by a method similar to that of step S13 described in the first embodiment. The deteriorating filter to be acquired may be a filter that can reduce a change in image effect according to the F-number of the imaging optical system.

Next, in step S14, the image processing apparatus performs deteriorating processing for the captured image acquired in step S11. The deteriorating processing is performed based on the deteriorating filter acquired in step S13.

In convolution of the deteriorating filter, pixels other than those at the positions where the deteriorating filters illustrated in FIG. 12D are disposed can be generated by interpolation using a plurality of deteriorating filters disposed nearby. At this time, the deteriorating filters include a first deteriorating filter located at a first position of the captured image and a second deteriorating filter located at a second position of the captured image. The first deteriorated filter is generated using the laid-out OTFs. The second deteriorating filter is generated by interpolating using the first deteriorating filter. This interpolation processing can change the deteriorating filter for each pixel, for example.

Third Embodiment

Figure 13:
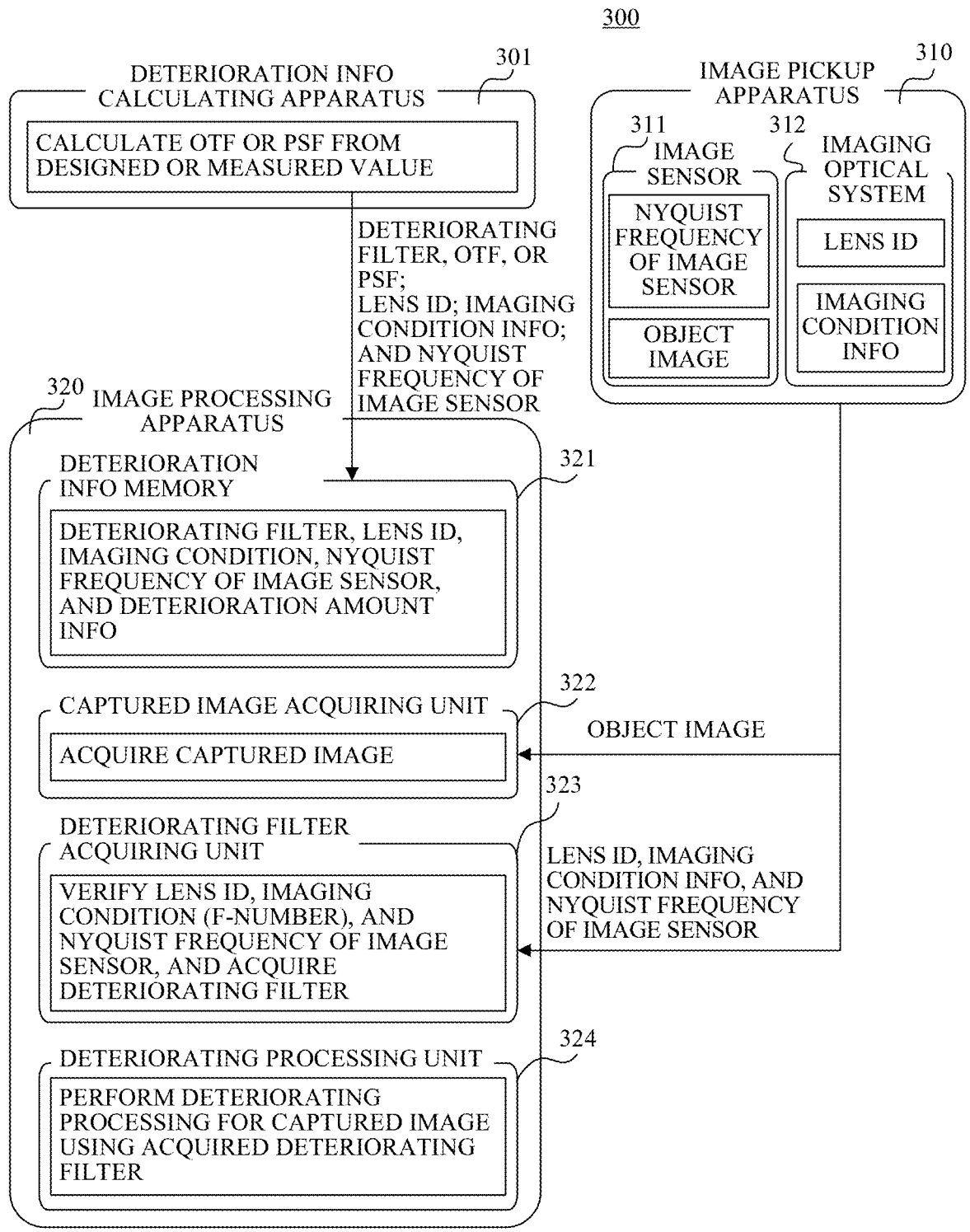
FIG. 13 explains an image processing system according to a third embodiment.

Referring now to FIG. 13, a description will be given of an image processing system according to a third embodiment of the disclosure. The image processing system according to this embodiment includes an image processing apparatus that performs the image processing method according to the first or second embodiment. FIG. 13 explains an image processing system 300 according to this embodiment. The image processing system 300 includes a deterioration information calculating apparatus 301, an image pickup apparatus 310, and an image processing apparatus 320.

The deterioration information calculating apparatus 301 performs processing for calculating a PSF or an OTF as a deteriorating filter based on a designed or measured value of the imaging optical system according to an imaging condition of a captured image. The image pickup apparatus 310 includes an image sensor 311 and an imaging optical system 312. The image pickup apparatus 310 adds lens ID of the imaging optical system 312, imaging condition information (F-number, zoom, imaging distance, etc.), a Nyquist frequency of the image sensor 311, etc., to the image captured by the imaging optical system 312, and outputs the image.

The image processing apparatus 320 includes a deterioration information memory 321, a captured image acquiring unit 322, a deteriorating filter acquiring unit 323 and a deteriorating processing unit 324. In a case where the image processing apparatus 320 performs processing according to the flow of the second embodiment, it further includes a processing determining unit. The image processing apparatus 320 stores the information output from the deterioration information calculating apparatus 301 and the image pickup apparatus 310, and uses the information to deteriorate the image captured by the imaging optical system 312 (to perform deteriorating processing for the captured image).

The deterioration information memory 321 stores the deteriorating filter or the PSF or the OTF for each of the various combinations of the imaging optical system 312 and the image sensor 311 calculated by the deterioration information calculating apparatus 301. The deterioration information memory 321 stores information on the number of taps, the lens ID, the imaging condition, and the Nyquist frequency of the image sensor. Thus, the deterioration information memory 321 is a storage unit configured to store the deteriorating filter according to the imaging condition of the captured image. The deterioration information memory 321 may store an OTF or a PSF for generating a deteriorating filter instead of the deteriorating filter itself. The deterioration information memory 321 may store a deterioration amount according to the imaging condition. The deterioration amount of the deteriorating filter may be adjusted so as to become a deterioration amount according to the imaging condition.

The captured image acquiring unit 322 acquires a captured image from the image pickup apparatus 310. The deteriorating filter acquiring unit 323 acquires a captured image from the image pickup apparatus 310 and acquires imaging condition information including the lens ID of the imaging optical system 312 (information on a type of the imaging optical system 312). The information on the type of the imaging optical system 312 includes, for example, information on whether the lens apparatus is an interchangeable lens or a fixed lens, the focal length of the imaging optical system, and the F-number (aperture value). The deteriorating filter acquiring unit 323 searches deteriorating filters stored in the deterioration information memory 321 based on the lens ID of the image pickup apparatus 310 to be used by the photographer and the imaging condition. Then, the deteriorating filter acquiring unit 323 acquires the deteriorating filter (suitable for the lens ID and the imaging condition for imaging). Here, the deteriorating filter to be acquired may be a filter that can reduce a change in image effect according to the F-number of the imaging optical system. The user may be allowed to select a virtual imaging optical system as the characteristic of the deteriorating filter, or the deteriorating filter may be acquired based on information on the virtual imaging optical system selected by the user.

In a case where the deterioration information memory 321 stores the OTF, the deteriorating filter acquiring unit 323 acquires the deteriorating filter based on the OTF. That is, the deteriorating filter acquiring unit 323 acquires the corresponding OTF (OTF suitable for the lens ID and imaging condition for imaging). The deteriorating filter acquiring unit 323 acquires the OTF to be used by the deteriorating processing unit 324 in a spatial frequency domain up to the Nyquist frequency of the image sensor 311 in the image pickup apparatus 310. That is, the deteriorating filter acquiring unit 323 acquires the OTF of the imaging optical system (imaging optical system 312) according to the position of the captured image using the acquired OTF. Thus, the deteriorating filter acquiring unit 323 is an OTF acquiring unit that acquires the OTF of the imaging optical system according to the position of the captured image. The deteriorating filter acquiring unit 323 generates a deteriorating filter that deteriorates the captured image using the acquired OTF. This is similarly applied to a case where a PSF is stored instead of the OTF. The deteriorating processing unit 324 performs deteriorating processing for the captured image using the acquired deteriorating filter.

If the deteriorating filter previously calculated by the deterioration information calculating apparatus 301 is stored in the deterioration information memory 321, it is unnecessary to provide the deterioration information calculating apparatus 301 to the user (photographer). The user can also download and use information necessary for the deteriorating processing, such as coefficient data, through a network or various storage media.

Fourth Embodiment

Figure 14:
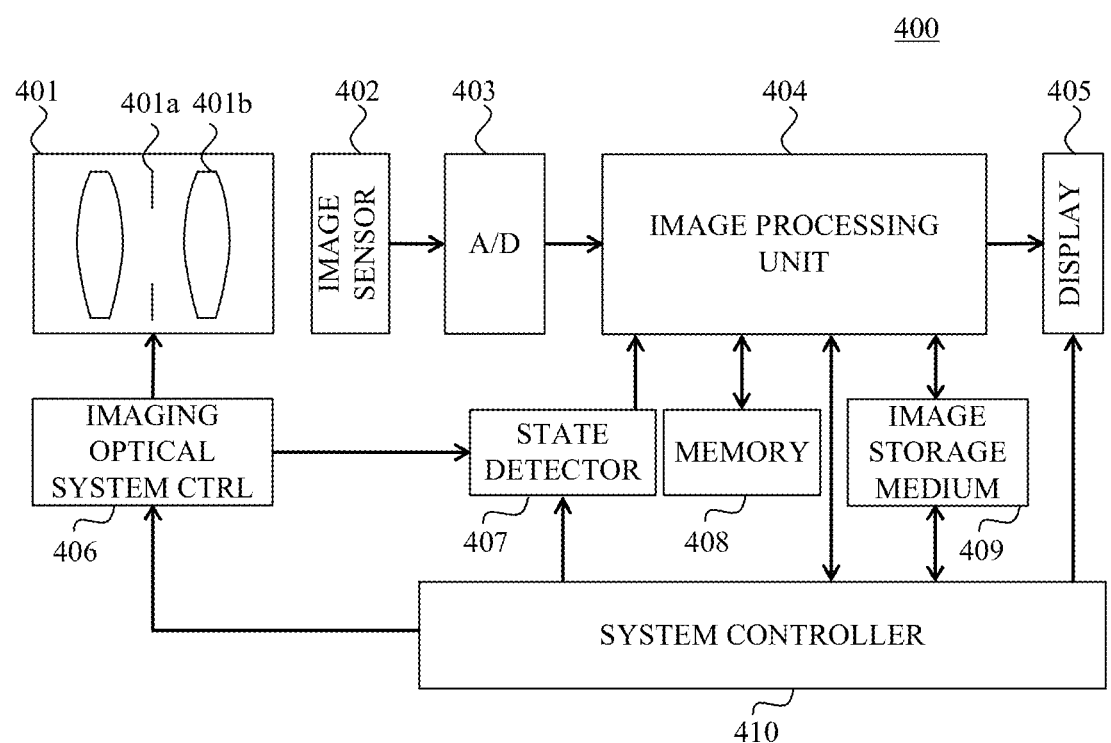
FIG. 14 is a block diagram of an image pickup apparatus according to a fourth embodiment.

Referring now to FIG. 14, a description will be given of an image pickup apparatus according to a fourth embodiment of the disclosure. FIG. 14 is a block diagram of the image pickup apparatus 400 according to this embodiment. An image processing program for performing deteriorating processing for a captured image (an image processing method similar to that of the first or second embodiment) is installed in the image pickup apparatus 400, and the deteriorating processing is executed by the image processing unit (image processing apparatus) 404 in the image pickup apparatus 400.

The image pickup apparatus 400 includes an imaging optical system (lens) 401 and an image pickup apparatus body (camera main body). The imaging optical system 401 includes a diaphragm (aperture stop) 401a and a focus lens 401b, and is integrated with an image pickup apparatus body (camera body). However, this embodiment is not limited to this example, and is applicable to an image pickup apparatus in which the imaging optical system 401 is interchangeably attached to the image pickup apparatus body.

The image sensor 402 (e.g., CMOS sensor) photoelectrically converts an object image (optical image, imaging light) formed via the imaging optical system 401 to generate a captured image. That is, the object image receives photoelectric conversion by the image sensor 402 and is converted into an analog signal (electrical signal). Then, the analog signal is converted into a digital signal by an analog-to-digital (A/D) converter 403 and the digital signal is input to the image processing unit 404.

The image processing unit 404 performs predetermined processing for the digital signal and also performs the deteriorating processing. The image processing unit 404 includes the captured image acquiring unit, the deteriorating filter acquiring unit, and the deteriorating processing unit, although each unit is not illustrated. In a case where the image processing unit 404 performs processing according to the flow of the second embodiment, it further includes a processing determining unit.

The image processing unit 404 has a function similar to that of the image processing apparatus 320 according to the third embodiment, and acquires the imaging condition information on the image pickup apparatus from the state detector 407. The imaging condition information is information about an F-number (aperture value), an imaging distance, a focal length of the zoom lens, and the like. The state detector 407 can acquire the imaging condition information directly from a system controller 410, but the disclosure is not limited to this embodiment. For example, the imaging condition information about the imaging optical system 401 can also be acquired from an imaging optical system control unit 406. Since the processing flow (image processing method) of the deteriorating processing according to this embodiment is similar to that of the first embodiment described with reference to FIG. 5, a description thereof will be omitted. The deteriorating filter is stored in a memory 408 in this embodiment.

An output image processed by the image processing unit 404 is stored in a predetermined format in an image storage medium 409. A display unit 405 can display an image that has received predetermined processing for display for the image that has received the deteriorating processing according to this embodiment. The disclosure is not limited to this embodiment, and an image that has received simple processing may be displayed on the display unit 405 for high-speed display.

A series of controls in this embodiment is performed by the system controller 410, and mechanical driving of the imaging optical system 401 is performed by the imaging optical system control unit 406 based on instructions from the system controller 410. The imaging optical system control unit 406 controls an aperture diameter of the diaphragm 401a as an imaging state setting of the F-number. The imaging optical system control unit 406 controls a position of the focus lens 401b by an unillustrated autofocus (AF) mechanism or manual focus mechanism for focusing according to the object distance. Functions such as aperture diameter control of the diaphragm 401a and manual focus need not be performed according to the specification of the image pickup apparatus 400.

This embodiment uses the deteriorating filter stored in the memory 408 of the image pickup apparatus, but an image pickup apparatus according to a modification may acquire the deteriorating filter stored in a storage medium, such as a memory card. The deteriorating filter may be stored in an unillustrated memory incorporated in the imaging optical system and acquired, or may be copied from the built-in memory in the imaging optical system to the memory 408.

Thus, in each embodiment, the image processing apparatus 320 (image processing unit 404) includes the deterioration information memory 321, the captured image acquiring unit 322, and the deteriorating processing unit 324. The deterioration information memory 321 acquires and stores imaging condition information including an F-number of an optical system (imaging optical systems 312 and 401). The captured image acquiring unit 322 acquires a captured image obtained using the optical system. That is, the captured image acquiring unit 322 and the deteriorating filter acquiring unit 323 function as an acquiring unit that acquires a captured image obtained using the optical system and information on an imaging condition corresponding to the captured image. The deteriorating processing unit 324 functions as a processing unit that performs deteriorating processing for the captured image based on the F-number of the optical system included in the information about the imaging condition. A first deterioration amount in deteriorating processing in a case where the F-number is a first F-number (first blur amount in performing deteriorating processing (blurring processing) for the captured image) is smaller than a second deterioration amount (second blur amount) in deteriorating processing in a case where the F-number is a second F-number larger than the first F-number.

The processing unit may perform the deteriorating processing so as to reduce a difference between a blur amount (deterioration amount) of the captured image based on the aberration of the optical system in a case where the F-number is the first F-number and a blur amount (deterioration amount) of the captured image based on the aberration of the optical system in a case where the F-number is the second F-number the aberration in the optical system in a case where the F-number is the second F-number. The processing unit may perform the deteriorating processing so as to reduce a difference between a deterioration amount of a focal plane in a case where the F-number is the maximum aperture and a deterioration amount of the focal plane in a case where the F-number is a third F-number larger than the maximum aperture.

The image processing apparatus may include a deteriorating filter acquiring unit 323 that acquires the deteriorating filter based on the F-number. In a case where the F-number is the first F-number, the deterioration amount of the deteriorating filter is a first deterioration amount, and in a case where the F-number is the second F-number, the deterioration amount of the deteriorating filter is a second deterioration amount. The imaging condition information may include information about a type of the optical system, and the deteriorating filter acquiring unit acquires the deteriorating filter based on the information about the type of the optical system. The deteriorating filter acquiring unit may acquire the deteriorating filter based on a PSF of the focal plane at the maximum aperture of the optical system. The imaging condition information may include information about the aberration of the optical system, and the deteriorating filter acquiring unit acquires the deteriorating filter based on the information about the aberration.

The processing unit may determine whether or not to perform deteriorating processing based on the imaging condition information. The imaging condition information may include information about the type of optical system, and the processing unit determines whether or not to perform deteriorating processing based on the information about the type of optical system. The processing unit may determine whether or not to perform the deteriorating processing based on the F-number.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide an image processing apparatus, an image pickup apparatus, an image processing method, a program, and a storage medium, each of which can provide an image effect caused by aberration even with a small aperture in an aperture stop.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-044907, filed on Mar. 22, 2022, which is hereby incorporated by reference herein in its entirety.

What is claimed is:

1. An image processing apparatus comprising:
at least one memory configured to store instructions; and
at least one processor configured to execute the instructions to:
acquire a captured image obtained using an optical system, and information on an imaging condition corresponding to the captured image; and
perform deteriorating processing for the captured image based on an F-number of the optical system, the F-number being included in the information on the imaging condition,
wherein a first deterioration amount in the deteriorating processing in a case where the F-number is a first F-number is smaller than a second deterioration amount in the deteriorating processing in a case where the F-number is a second F-number larger than the first F-number,
wherein the at least one processor further executes the instructions to acquire a deteriorating filter based on the F-number,
wherein the at least one processor executes the instructions to perform the deterioration processing using the deteriorating filter,
wherein in a case where the F-number is the first F-number, a deterioration amount of the deteriorating filter is the first deterioration amount, and
wherein in a case where the F-number is the second F-number, the deterioration amount of the deteriorating filter is the second deterioration amount,
wherein the at least one processor executes the instructions to acquire the deteriorating filter based on a point spread function of a focal plane at a maximum aperture of the optical system.

2. The image processing apparatus according to claim 1, wherein the first deterioration amount and the second deterioration amount are a first blur amount and a second blur amount, respectively, in performing the deteriorating processing for the captured image.

3. The image processing apparatus according to claim 1, wherein the at least one processor further executes the instructions to perform the deteriorating processing so as to reduce a difference between a blur amount of the captured image caused by aberration in the optical system in a case where the F-number is the first F-number and a blur amount of the captured image caused by the aberration in the optical system in a case where the F-number is the second F-number.

4. The image processing apparatus according to claim 1, wherein the at least one processor further executes the instructions to perform the deteriorating processing so as to reduce a difference between a deterioration amount of a focal plane in a case where the F-number is a maximum aperture, and a deterioration amount of the focal plane in a case where the F-number is a third F-number larger than the maximum aperture.

5. The image processing apparatus according to claim 1, wherein the information on the imaging condition includes information on a type of the optical system, and
wherein the at least one processor executes the instructions to acquire the deteriorating filter based on the information on the type of the optical system.

6. The image processing apparatus according to claim 1, wherein the information on the imaging condition includes information on aberration of the optical system, and
wherein the at least one processor executes the instructions to acquire the deteriorating filter based on the information on the aberration.

7. The image processing apparatus according to claim 1, wherein the at least one processor further executes the instructions to determine whether or not to perform the deteriorating processing based on the information on the imaging condition.

8. The image processing apparatus according to claim 7, wherein the information on the imaging condition includes information on a type of the optical system, and
wherein the at least one processor executes the instructions to determine whether or not to perform the deteriorating processing based on the information on the type of the optical system.

9. The image processing apparatus according to claim 7, wherein the at least one processor executes the instructions to determine whether or not to perform the deteriorating processing based on the F-number included in the information on the imaging condition.

10. An image pickup apparatus comprising:
an image processing apparatus; and
an image sensor configured to photoelectrically convert an optical image formed by an optical system,
wherein the image processing apparatus includes:
at least one memory configured to store instructions; and
at least one processor configured to execute the instructions to:
acquire a captured image obtained using an optical system, and information on an imaging condition corresponding to the captured image; and
perform deteriorating processing for the captured image based on an F-number of the optical system, the F-number being included in the information on the imaging condition, and
wherein a first deterioration amount in the deteriorating processing in a case where the F-number is a first F-number is smaller than a second deterioration amount in the deteriorating processing in a case where the F-number is a second F-number larger than the first F-number,
wherein the at least one processor further executes the instructions to acquire a deteriorating filter based on the F-number,
wherein the at least one processor executes the instructions to perform the deterioration processing using the deteriorating filter,
wherein in a case where the F-number is the first F-number, a deterioration amount of the deteriorating filter is the first deterioration amount, and
wherein in a case where the F-number is the second F-number, the deterioration amount of the deteriorating filter is the second deterioration amount,
wherein the at least one processor executes the instructions to acquire the deteriorating filter based on a point spread function of a focal plane at a maximum aperture of the optical system.

11. An image processing method comprising:
acquiring a captured image obtained using an optical system, and information on an imaging condition corresponding to the captured image; and
performing deteriorating processing for the captured image based on an F-number of the optical system included in the information on the imaging condition,
wherein a first deterioration amount in the deteriorating processing in a case where the F-number is a first F-number is smaller than a second deterioration amount in the deteriorating processing in a case where the F-number is a second F-number larger than the first F-number,
wherein the acquiring a deteriorating filter is based on the F-number,
wherein performing the deterioration processing is using the deteriorating filter,
wherein in a case where the F-number is the first F-number, a deterioration amount of the deteriorating filter is the first deterioration amount, and
wherein in a case where the F-number is the second F-number, the deterioration amount of the deteriorating filter is the second deterioration amount,
wherein the acquiring the deteriorating filter is based on a point spread function of a focal plane at a maximum aperture of the optical system.

12. A non-transitory computer-readable storage medium storing a program for causing a computer to execute the image processing method according to claim 11.

* * * * *